US011281279B2

(12) United States Patent
Sodhi et al.

(10) Patent No.: US 11,281,279 B2
(45) Date of Patent: Mar. 22, 2022

(54) TRACKING POWER CONSUMPTION USING MULTIPLE SAMPLING FREQUENCIES

(71) Applicant: Apple Inc., Cupertino, CA (US)

(72) Inventors: Inder M. Sodhi, Palo Alto, CA (US); Daniel U. Becker, San Jose, CA (US); Achmed R. Zahir, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 16/373,461

(22) Filed: Apr. 2, 2019

(65) Prior Publication Data

US 2020/0319690 A1    Oct. 8, 2020

(51) Int. Cl.
*G06F 1/32* (2019.01)
*G06F 1/3206* (2019.01)
*G06F 1/3234* (2019.01)
*G06F 1/20* (2006.01)
*G06F 1/324* (2019.01)
*G06F 1/3296* (2019.01)

(52) U.S. Cl.
CPC .......... *G06F 1/3206* (2013.01); *G06F 1/3234* (2013.01); *G06F 1/206* (2013.01); *G06F 1/324* (2013.01); *G06F 1/3296* (2013.01)

(58) Field of Classification Search
None
See application file for complete search history.

(56) References Cited

U.S. PATENT DOCUMENTS

| 7,925,901 | B2 | 4/2011 | Felter et al. | |
|---|---|---|---|---|
| 8,442,786 | B2 | 5/2013 | Naffziger et al. | |
| 9,274,581 | B2 | 3/2016 | Berke et al. | |
| 2011/0301889 | A1* | 12/2011 | Naffziger | G06F 1/3203 702/62 |
| 2012/0005514 | A1* | 1/2012 | Henry | G06F 1/3203 713/340 |
| 2012/0105050 | A1* | 5/2012 | Naffziger | G01R 31/31721 324/103 R |
| 2012/0109550 | A1* | 5/2012 | Naffziger | G06F 11/3062 702/61 |
| 2016/0170465 | A1* | 6/2016 | Flynn | G06F 1/3296 713/320 |

\* cited by examiner

*Primary Examiner* — Fahmida Rahman
(74) *Attorney, Agent, or Firm* — Kowert, Hood, Munyon, Rankin & Goetzel, P.C.

(57) ABSTRACT

An apparatus includes a processing circuit, a power processing module, and a power management circuit. The power management circuit is configured to estimate, over time, energy consumption of the processing circuit, and to sample the estimated energy consumption using a plurality of different sampling frequencies. Each of the different sampling frequencies is used to generate a respective set of power values. The power management circuit is further configured to track a particular characteristic for each set of power values, and then to provide, for each set of power values, a particular power value that corresponds to the particular characteristic to the power processing module. Based on at least one of the particular power values, the power processing module is configured to adjust an operating parameter of the processing circuit.

20 Claims, 7 Drawing Sheets

TRACKING POWER CONSUMPTION USING MULTIPLE SAMPLING FREQUENCIES

BACKGROUND

Technical Field

Embodiments described herein are related to the field of integrated circuits, and more particularly to power management of circuits in an integrated circuit.

Description of the Related Art

Computer systems, including systems-on-a-chip (SoCs), may include one or more processor cores as well as multiple other circuits such as co-processors, audio and video circuits, networking and communication interfaces, and the like. When these processor cores and other circuits are active, they consume power and generate heat. In applications in which a power supply is limited, such as battery-powered mobile computing devices (e.g., laptop computers, tablet computers, smart phones, and wearable devices), increased power consumption results in shorter battery life. Heat may pose an issue in computer systems and mobile devices, even if the power supply is plentiful for the system. Heat in a computer system may result in inconsistent or faulty performance, or even outright failure of one or more circuits as components and devices may exceed reliable operating limits and, therefore, fail to perform as designed.

SUMMARY OF THE EMBODIMENTS

Broadly speaking, a system, an apparatus, and a method are contemplated in which the apparatus includes a processing circuit, a power processing module, and a power management circuit. The power management circuit may be configured to estimate, over time, energy consumption of the processing circuit, and to sample the estimated energy consumption using a plurality of different sampling frequencies. Each of the different sampling frequencies may be used to generate a respective set of power values. The power management circuit may be further configured to track a particular characteristic for each set of power values, and then to provide, for each set of power values, a particular power value that corresponds to the particular characteristic to the power processing module. Based on at least one of the particular power values, the power processing module may be configured to adjust an operating parameter of the processing circuit.

In an example, the particular power value tracked by the power management circuit may correspond to a maximum power value of the particular set of power values. In one example, to estimate energy consumption of the processing circuit, the power management circuit may utilize separate estimates for dynamic currents and for leakage currents. In an embodiment, the power management circuit may assert a processor interrupt signal in response to a determination that a generated power value of the particular set reaches a threshold value.

In another example, the power management circuit may be further configured to increment a count value in response to a determination that a generated power value of the particular set of power values satisfies a threshold value. In an embodiment, a new value for the threshold value may be selectable by software. The power management circuit may update the threshold value to the new value after a next sample of the estimated energy consumption is taken.

In a further example, to adjust the operating parameter of the processing circuit, the power processing module may be further configured to determine an average power consumption over a first time period using the particular power value corresponding to the set of power values that were generated using a lowest sampling frequency, and to determine a dynamic power consumption over a second time period, shorter than the first time period, using the particular power value corresponding to the set of power values that were generated using a highest sampling frequency. The power processing module may also be configured to, based on the average power consumption and the dynamic power consumption, determine an operating parameter of the processing circuit to adjust.

BRIEF DESCRIPTION OF THE DRAWINGS

The following detailed description makes reference to the accompanying drawings, which are now briefly described.

Figure 1:
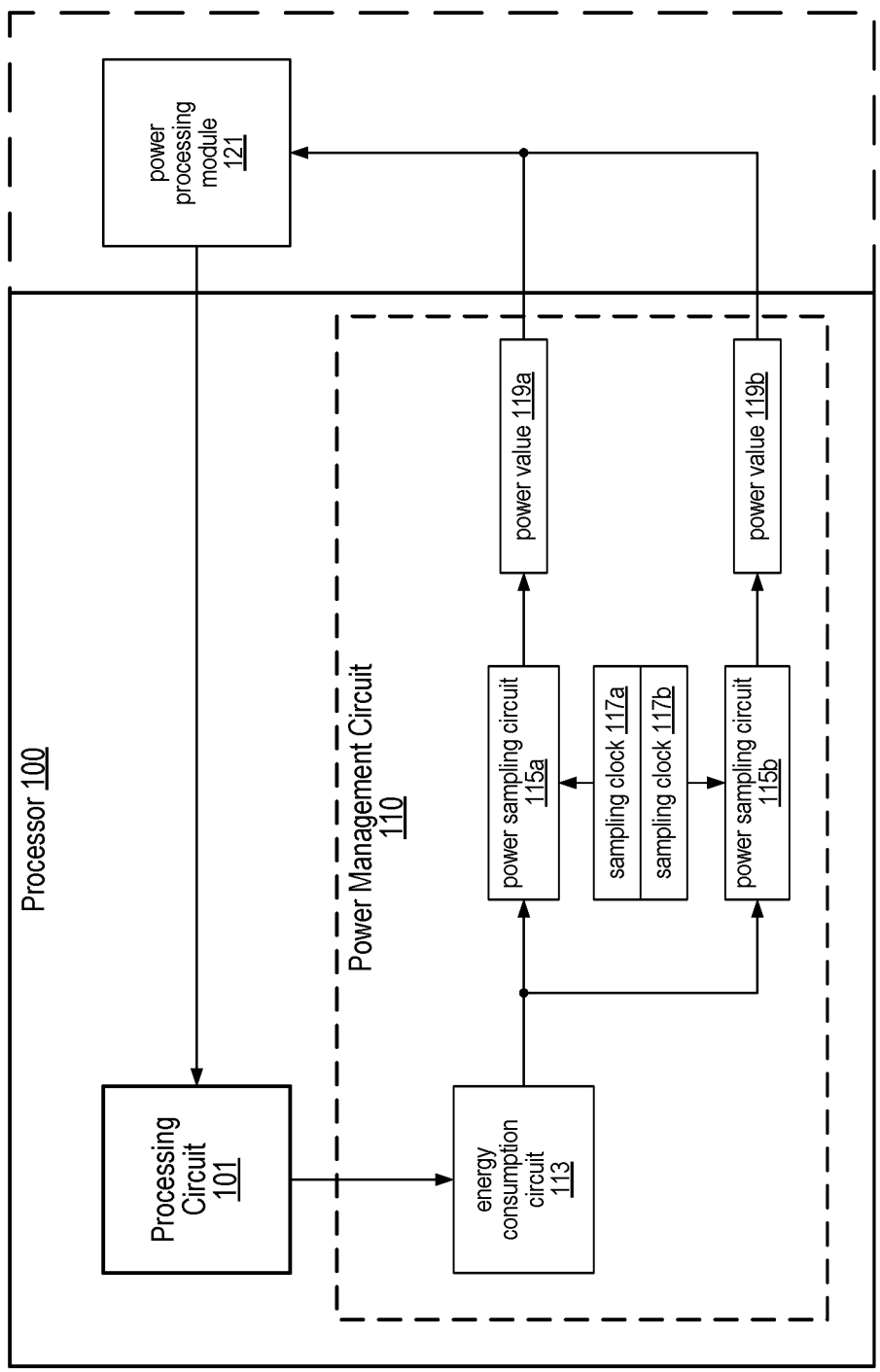
FIG. 1 illustrates a block diagram of an embodiment of a processor that includes a power management circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f)

interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Power management units may be used in computer systems, including systems-on-a-chip (SoCs), to monitor an amount of power being used by one or more circuits. Based on the amount of power being used, control circuits may cause the computer system to enter a reduced power mode in an attempt to reduce the amount of power being used in order to prolong battery life, and/or to reduce an amount of heat generated by the computer system. These power management units may estimate an amount of power being used by some or all circuits in the computer system based on voltage levels of power signals, frequencies of clock signals, and current operating modes of the circuits. To generate the power estimates, these power signals, clock signals, and operating modes may be sampled on a periodic basis. A frequency of these samples determines a resolution for observing the power usage of the system.

A low sampling frequency for samples may provide a suitably accurate estimate for average power consumption over time. The low sampling frequency may also result in a reduced amount of power being used for power management activities, as fewer samples require less work to process relative to a higher sampling frequency. The estimated average power consumption may be used to adjust one or more operating conditions in the computer system, for example, voltage levels of power signals and frequencies of clock signals that are distributed throughout the system. The low sampling frequency may also prevent observation of dynamic changes in short-term power consumption, including capturing peaks and valleys in the power usage that may be used to identify temporary conditions that may not have a significant impact on battery life or heat generation, but that may cause other issues such as a brief voltage drop or voltage spike that may cause a circuit to glitch, causing improper operation of the circuit.

Using a higher sampling frequency than the low sampling frequency may provide increased resolution for capturing more of the dynamic power fluctuations that can occur during operation of the computer system, including the peaks and valleys of power usage that may indicate points in time that could possibly cause a glitch. The higher sampling frequency, however, may cause the power management unit to use more power itself. In addition, the higher sampling frequency may require additional processing of the power estimates. This additional processing may require additional circuits, or diversion of existing circuits, to perform the processing, resulting in increased circuit costs for the additional circuits, or reduced performance from diverting other circuits.

Embodiments of apparatus and methods for managing power are disclosed herein that may provide a capability to observe both average power consumption as well as dynamic power consumption without a significant increase to circuit sizes or reduced performance. Disclosed embodiments include a power management circuit that estimates energy consumption of a processing circuit, and then samples the energy consumption estimates using a plurality of sampling frequencies. Respective power value sets may be generated based on each of the sampling frequencies. Particular characteristics of each of the power value sets may be tracked to identify a particular power value in each set. The identified power values may then be provided to a power processing module that, based on the identified values, adjusts one or more operating values of the processing circuit.

A block diagram for an embodiment of a processor that includes a power management circuit is illustrated in FIG. 1. Processor 100 includes processing circuit 101 and power management circuit 110. Power management circuit 110 further includes energy consumption circuit 113, power sampling circuits 115a and 115b (referred to collectively as power sampling circuits 115), and sampling clocks 117a and 117b (collectively sampling clocks 117). In various embodiments, power processing module 121 may be included in (as indicated by the dashed line), or coupled to, processor 100. Power sampling circuits 115a and 115b each generate respective power values 119a and 119b. In various embodiments, processing circuit 101 and power management circuit 110 may be included in a single integrated circuit (IC), or may be included in multiple ICs coupled to each other via one or more circuit boards.

As illustrated, processing circuit 101 represents any suitable circuit that receives one or more input signals and produces one or more output signals based on the received input. In some embodiments, processing circuit 101 may correspond to a single general-purpose processor core, while in other embodiments, processing circuit 101 may include multiple cores included in a core complex. Processing circuit 101 may also correspond to one or more co-processors, such as an audio processor, graphics processing unit, network processor, floating-point arithmetic unit, and the like.

Power management circuit 110, as shown, includes circuits for monitoring energy usage of processing circuit 101. In various embodiments, power management circuit 110 may be included in a processor complex with processing circuit 101, within a power management unit (not shown) configured to distribute power to processor 100 and other circuits, or a combination thereof. As illustrated, power management circuit 110 is configured to estimate, over time, energy consumption of processing circuit 101 using energy consumption circuit 113 to increment an accumulated energy value based on operating modes and conditions of processing circuit 101. For example, at a series of points in time, energy consumption circuit 113 may receive, measure, or estimate, values for an operating voltage and operating frequency of processing circuit 101. Energy consumption circuit 113 may further receive an indication of an operating mode for processing circuit 101 at the corresponding points in time. This operating mode may be indicative of an amount of activity of processing circuit 101. Additional conditions, such as a temperature value, may also be received, and using these values, energy consumption circuit 113 may increment the accumulated energy value.

The accumulated energy value indicates an amount of energy used from a point in time when the accumulated energy value was last reset. In some embodiments, the accumulated energy value may be reset periodically, while in other embodiments, the accumulated energy value rolls over back to an initial value upon reaching a maximum value. Power management circuit 110 periodically samples the accumulated energy value in energy consumption circuit 113 using power sampling circuits 115. Using consecutively sampled values, power sampling circuits 115a and 115b generate power values 119a and 119b, respectively. For each new sample, power sampling circuits 115 subtract the previous sample to determine an amount of energy used over respective sampling windows. A length of the respective sampling windows is based on frequencies of respective sampling clocks 117a and 117b.

A different sampling frequency is used to generate respective sets of power values 119. Sampling clock 117a runs at a first frequency, establishing a first sample window size for power sampling circuit 115a. In a similar manner, sampling clock 117b runs at a second frequency, different from the first frequency, establishing a second sample window size for power sampling circuit 115b. For example, sampling clock 117a may run at a frequency that creates a sampling window of 10 milliseconds, while sampling clock 117b runs at a frequency that creates a sampling window of 10 microseconds, or 1000 times faster than power sampling circuit 115a. Power sampling circuit 115a may, therefore, collect a set of power values 119a that are indicative of average power usage of processing circuit 101. Power sampling circuit 115b may collect a set of power values 119b that are indicative of dynamic power usage of processing circuit 101.

In some embodiments, sampling clocks 117 may be implemented as independent clock sources each configured to generate respective sampling triggers at desired frequencies. In other embodiments, sampling clocks 117 may be implemented as respective clock divider circuits for dividing a frequency of a same source clock signal to generate the respective sampling triggers at a programmed number of cycles of the source clock.

In addition to sampling the accumulated energy value in energy consumption circuit 113, power sampling circuits 115, in the illustrated embodiment, track a particular characteristic for each of the sets of power values 119. For example, power sampling circuit 115a may track a maximum sampled value of power value 119a. As another example, power sampling circuit 115b may track a minimum sampled value of power value 119b. Power sampling circuits 115 may be independently configured to track respective characteristics based on different criteria. It is noted that a number of samples of power values 119a or 119b is referred to as a set. As used herein, "a set of power values" refers to a series of samples taken by a respective one of power sampling circuits 115 and used to determine a particular minimum or maximum power value. For example, if a particular maximum value for power value 119a is determined from a series of 35 samples, then these 35 samples comprise a set of power values 119a. In various embodiments, power management circuit 110 may or may not concurrently store all 35 samples of the set.

Power processing module 121 may receive, from power management circuit 110, the sets of power values 119 and/or the particular tracked values. One or more tracked values may be utilized by power processing module 121 to adjust, based on the tracked power values, an operating parameter of the processing circuit. For example, a maximum value of power value 119a may be used to determine if the average power usage of processing circuit 101 is too high, and in response, cause a voltage level of a power supply signal and/or a frequency of a clock signal used by processing circuit 101 to be reduced, potentially reducing power consumption of processing circuit 101. In a complementary example, a minimum value of power value 119a may indicate that processing circuit 101 has unused bandwidth and performance may be increased by increasing the voltage level of the power supply signal and/or the frequency of the clock signal. Minimum and maximum values of power value 119b may be used to detect fluctuations in the dynamic power usage of processing circuit 101. Based on detected fluctuations, an operating mode of processing circuit 101 may be changed to potentially reduce reoccurrences of such fluctuations.

In various embodiments, power processing module 121 may correspond to a hardware circuit configured to analyze the received power values or to a processing core executing instructions to analyze the received power values. In some embodiments, power processing module 121 may correspond to a software module executing on processing circuit 101 or other processing core in processor 100. For example, power processing module 121 may be a background process running as part of an operating system in processor 100.

Although two power sampling circuits 115 are shown in FIG. 1, any suitable number may be included. It is noted that a single energy consumption circuit 113 is used to determine the accumulated energy used by processing circuit 101, and then multiple power sampling circuits 115 are used to sample the accumulated energy value at the different sampling frequencies. Using a single energy consumption circuit may allow a circuit designer to localize analog circuits, energy calculation circuits, and any other circuits that may consume non-trivial amounts of power or that may require non-trivial amounts of circuit area into a single instance for processing circuit 101. Power sampling circuit 115 may include digital-only circuits that are smaller and use less power than energy consumption circuit 113, allowing for multiple instances to be added to power management circuit 110 with an acceptably small increase to power consumption and/or circuit area.

It is also noted that processor 100 as illustrated in FIG. 1 is merely an example. The illustration of FIG. 1 has been simplified to highlight features relevant to this disclosure. Various embodiments may include different configurations of the circuit blocks, including additional circuit blocks, such as, for example, additional power sampling circuits.

Figure 2:
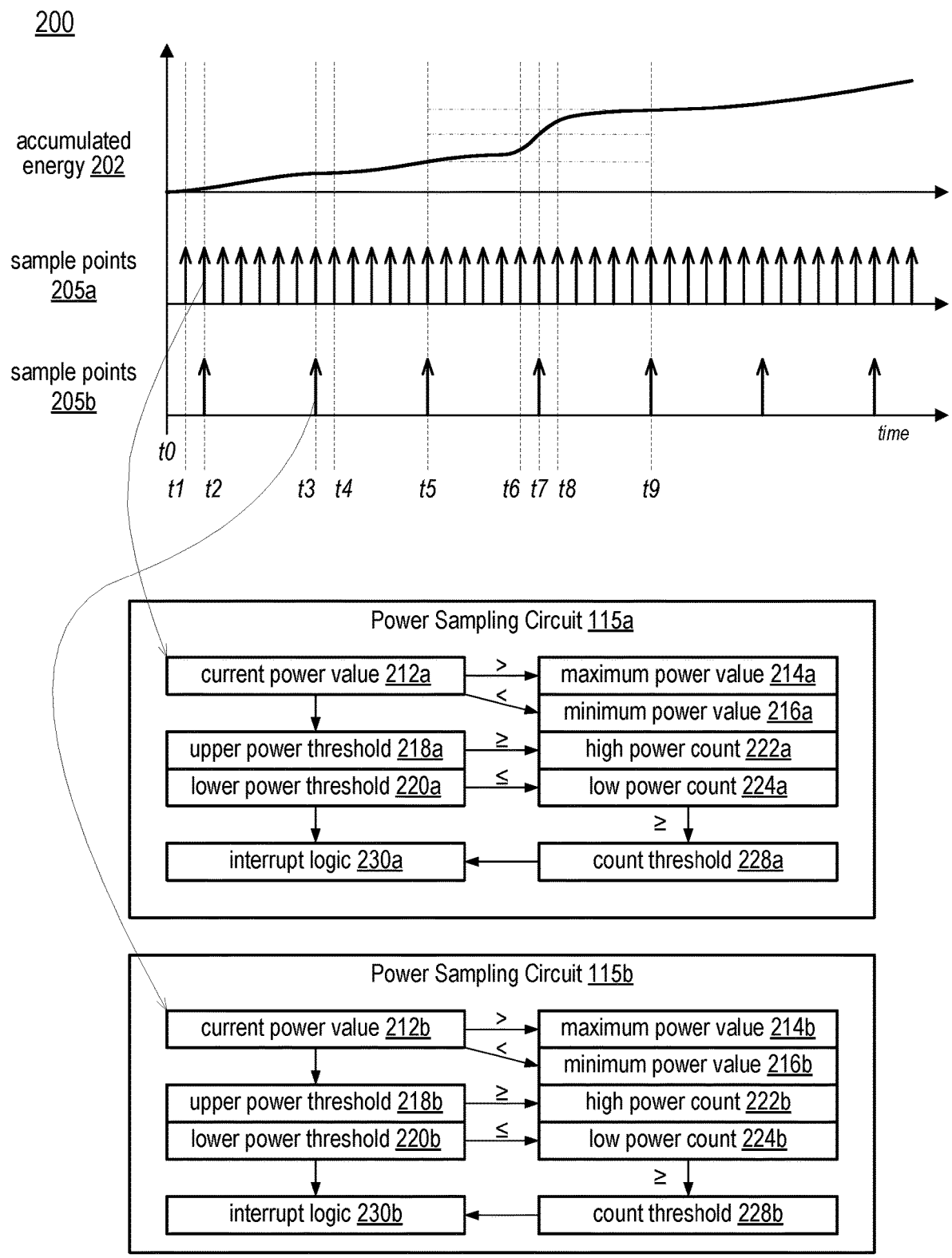
FIG. 2 shows a block diagram of two embodiments of a power sampling circuit in addition to a chart depicting several waveforms associated with the power sampling circuits.

Further details of power sampling circuits are provided in FIG. 2. In addition, FIG. 2 includes a timing diagram that depicts an example of signals associated with power sampling circuits. Power sampling circuits 115a and 115b are shown with registers for storing a variety of values. These values include current power value 212, maximum power value 214, minimum power value 216, upper power threshold 218, lower power threshold 220, high-power count 222, low-power count 224, and count threshold 228. Values with a suffix of 'a' are included in power sampling circuit 115a while values with a suffix of 'b' are included in power sampling circuit 115b. In addition, power sampling circuits 115 each include respective interrupt logic 230a and 230b (collectively interrupt logic 230).

Chart 200 includes three wave forms that demonstrate an example of sampling an accumulated energy using two different sampling frequencies. Accumulated energy 202 represents an accumulated energy value that is incremented by energy consumption circuit 113 over time. Sampling points 205a depicts a series of arrows indicating points in time at which power sampling circuit 115a samples accumulated energy 202. In a similar manner, sample points 205b depicts a series of arrows indicating points in time at which power sampling circuit 115b samples accumulated energy 202.

At time t0, accumulated energy 202 is zero and neither of power sampling circuits 115 are taking a sample of accumulated energy 202. Time t0 may correspond to a point in time at which power management circuit 110 is enabled, such as after a power-on event or a reset of processor 100. Registers for storing maximum power values 214, high-power counts 222, and low-power counts 224 may all be initialized to a starting value of zero. Other initial values may also be used, for example, minimum power values 216 may be initialized to a maximum value. Additionally, either of power sampling circuits 115 may receive respective values for upper power threshold 218, lower power threshold 220, and count threshold 228.

At time t1, power sampling circuit 115a takes a first sample of accumulated energy 202. At time t2, power sampling circuit 115b takes a first sample of accumulated energy 202 while power sampling circuit 115a takes a second sample of accumulated energy 202. Using the first and second samples, power sampling circuit 115a determines a first value for current power value 212a. The time frame between times t1 and t2 may be referred to as a sample window for power sampling circuit 115a and current power value 212a indicates the power usage estimate for this sample window.

As illustrated, this value of current power value 212a is compared to the initial values of maximum power value 214a and minimum power value 216a. Since accumulated energy value rises slightly between times t1 and t2, current power value 212a is greater than zero and the value is therefore stored as a new maximum power value 214a. Similarly, current power value 212a is less than the maximum value currently stored as minimum power value 216a and the new value, therefore, replaces the maximum value as minimum power value 216a. Current power value 212a may also be compared to upper power threshold 218 and lower power threshold 220a. If current power value 212a reaches either threshold value, then a respective one of high-power count 222a or low-power count 224a is incremented. As used herein, to "reach a threshold" or "reaching a threshold" refers to a value being greater than an upper threshold value or less than a lower threshold value. In some embodiments, reaching a threshold may include the value equaling either the upper or lower threshold values.

It is noted that each of the upper and lower threshold comparisons may, in some embodiments, be disabled. For example, the upper or lower threshold comparison may be disabled by storing a particular value, such as zero, as the respective threshold value. In other embodiments, one or more control data bits in a control register (not illustrated) may be used to enable or disable the threshold comparisons.

Between times t2 and t3, a series of several additional samples of accumulated energy 202 are taken by power sampling circuit 115a. The series of samples are used to determine a set of power values for each sample window. For each new value of current power value 212a, comparisons are made as described above and register values may be updated accordingly. At time t3, both power sampling circuits 115 take respective samples of accumulated energy 202. For power sampling circuit 115b, this is the second sample, thus completing a first sample window. As described for power sampling circuit 115a, a first value for current power value 212b is determined and then compared with the initial values of both maximum power value 214b and minimum power value 216b. Since this is the first comparison for power sampling circuit 115b, current power value 212b may replace the initial values in both maximum power value 214b and minimum power value 216b. If thresholds are enabled for power sampling circuit 115b, then current power value 212b is compared to upper power threshold 218b and lower power threshold 220b and high-power count 222b or low-power count 224b may be incremented if either threshold value is reached.

At time t4, power sampling circuit 115a takes another sample of accumulated energy 202. As shown, there is little energy accumulation between times t3 and t4. The new current power value 212a may, therefore, be less than minimum power value 216a, resulting in current power value 212a replacing the previous minimum power value 216a. In addition, current power value 212a may reach lower power threshold 220a, resulting in low-power count 224a being incremented.

Between times t5 to t9, an example is highlighted that demonstrates a benefit of using two sampling frequencies. From time t5 to time t9, power sampling circuit 115b completes two sample windows, each window yielding similar current power values 212b. Although there is a distinct increase in accumulated energy 202 between times t6 and t8, the power values determined by the two sample windows of power sampling circuit 115b may not be distinctive enough to reach, for example, upper power threshold 218b. Due to the longer sampling windows of sample points 205b, a distinct increase in energy usage over a short period of time may be offset by a period of little increase in energy usage within the same sample window. As shown, the power values for the sample windows of t5 to t7 and t7 to t9 may average out to values that do not reach a threshold level.

With the inclusion of power sampling circuit 115a, a smaller sample window may be used to determine more dynamic changes in accumulated energy 202 over a shorter time period as compared with power sampling circuit 115b. With a shorter time period, power sampling circuit 115a takes several samples between times t5 and t6, during which accumulated energy 202 has minimal increases. In some cases, these minimal increases may result in new values for minimum power value 216a and/or one or more increases to low-power count 224a. During the sample windows of t6 to t7 and t7 to t8, however, distinct increases in accumulated energy 202 occur and may be captured by current power value 212a for each sample window. Since power sampling circuit 115a uses a shorter sample window than power sampling circuit 115b, values for current power value 212a are different than the values for current power value 212b. The increase in the accumulated energy between times t6 and t7 and between times t7 and t8 may result in large increases in current power value 212a for these two samples. The value for current power value 212a corresponding to one or both of the two consecutive sample windows may reach upper power threshold 218a and cause an increase to high-power count 222a. One of these two consecutive current power values 212a may also be captured as a new maximum power value 214a.

As illustrated, each of power sampling circuits 115 includes respective interrupt logic 230. Interrupt logic 230 includes logic circuits for asserting one or more interrupt signals that may cause a processor core included in processor 100, e.g., processing circuit 101 or power processing module 121, to perform an interrupt service routine. Various interrupt options may be included in interrupt logic 230, such as options to assert an interrupt signal in response to current power value 212 reaching either upper power threshold 218 or lower power threshold 220, and/or to assert an interrupt signal in response to either high-power count 222 or low-power count 224 reaching count threshold 228. In some embodiments, count threshold 228 may include separate threshold values for high-power count 222 and low-power count 224, respectively. Each interrupt option may be enabled or disabled independently.

In some embodiments, each interrupt option may include a respective interrupt signal while, in other embodiments, some or all of the interrupt options may share an interrupt signal. These interrupt options may be utilized to cause a processing circuit in processor 100, or in another part of a computer system that includes processor 100, to execute an interrupt service routine that may read one or more of the registers in the power sampling circuit 115 that asserted the interrupt signal and perform actions based on the read values. For example, in one embodiment, an interrupt signal may be asserted in response to upper power threshold 218a being reached, causing a power monitoring software module that is executing as part of an operating system to take actions to reduce power consumption by processing circuit 101, such as moving one or more tasks being performed by processing circuit 101 to a different processing circuit, if available.

Some registers in power sampling circuits 115 may be programmable by one or more processing circuits in processor 100, such as processing circuit 101 or power processing module 121. Upper power threshold 218, lower power threshold 220, and count threshold 228 may each be programmable. These registers may be programmable while power sampling circuit 115 is active, allowing thresholds to be modified "on the fly." If one or more of these registers is updated while power sampling circuit 115 is active, then the new values are updated at end of the current sample window. As a result, current power value 212 may be compared to the old threshold values at the end of the current sample window and then compared to the new threshold values at the respective ends of subsequent sample windows. In some embodiments, initial values for maximum power value 214, minimum power value 216, high-power count 222, and/or low-power count 224 may also be programmable.

It is noted that the embodiments of FIG. 2 are merely examples. The waveforms of chart 200 are simplified to clearly demonstrate the disclosed concepts. In other embodiments, the relative numbers of sampling points 205a and 205b may be increased or decreased relative to the rates of change of accumulated energy 202. Power sampling circuits 115, in other embodiments, may include additional logic circuits for accessing values of accumulated energy 202 from energy consumption circuit 113, and for performing comparisons of a current power value to the present minimum and maximum power values, as well as to the upper and lower thresholds.

Figure 3:
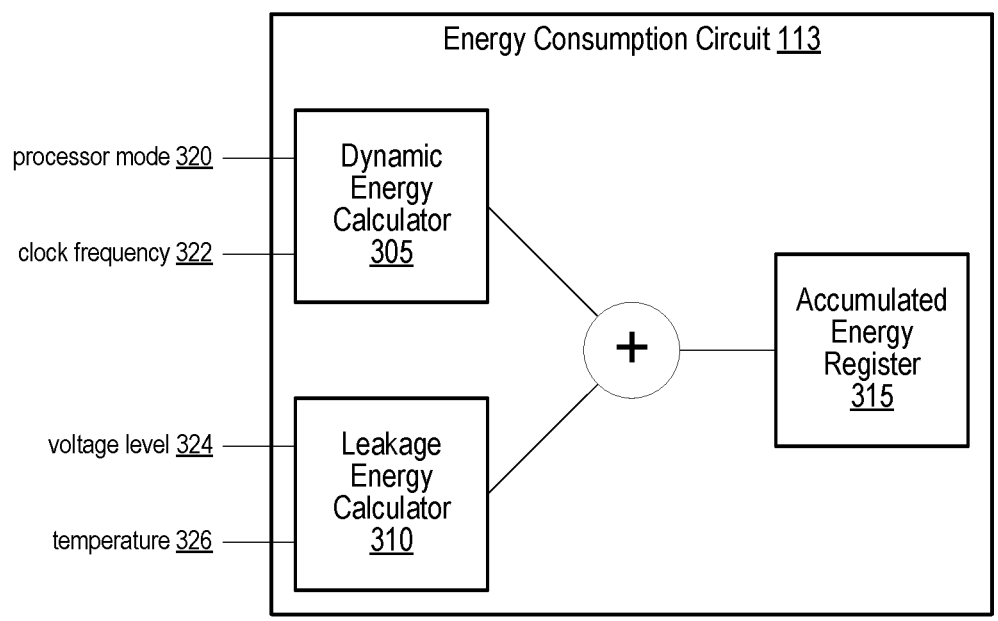
FIG. 3 depicts a block diagram of an embodiment of an energy consumption circuit.

FIG. 2 discloses additional details of power sampling circuits 115 from FIG. 1. In FIG. 3, additional details of energy consumption circuit 113 are presented.

Moving to FIG. 3, a block diagram of an embodiment of an energy consumption circuit is illustrated. As shown, energy consumption circuit 113 determines an accumulated energy usage due to dynamic current and leakage current in processing circuit 101. Energy consumption circuit 113 is shown to include dynamic energy calculator 305, leakage energy calculator 310 and accumulated energy register 315. Energy consumption circuit 113 receives several signals that are used to estimate an amount of energy used by processing circuit 101. These signals include processor mode 320, clock frequency 322, voltage level 324, and temperature 326.

As disclosed above, energy consumption circuit 113 generates an estimated value that indicates an amount of energy that processing circuit 101 is currently consuming. To do this, energy consumption circuit 113 estimates two types of energy use, dynamic and leakage. Dynamic energy refers to the energy used to operate active circuits, e.g., the energy that is used to cause transistors to turn on and off, or that is used to change voltage levels on various circuit elements (resistors, capacitors, and the like). Leakage energy refers to energy that is lost due to current that leaks or passes through transistors (or other similar types of transconductance devices) when the transistors are turned off.

To determine the energy usage due to dynamic current, dynamic energy calculator 305, as shown, receives two signals, processor mode 320 and clock frequency 322. In other embodiments, dynamic energy calculator may receive additional, or a different set of, signals. Processor mode 320 indicates a current operating mode for processing circuit 101. In some embodiments, processor mode 320 may only indicate if processing circuit 101 is enabled or disabled. In other embodiments, processor mode 320 may have a variety of values that are indicative of a level of activity in processing circuit 101. For example, processing circuit 101 may include a plurality of sub-circuits and processor mode 320 may provide an indication of which sub-circuits are active, or how many sub-circuits are active.

Clock frequency 322 provides an indication of a frequency of a clock signal used by processing circuit 101. In some embodiments, clock frequency 322 may indicate a respective frequency for each of several clock signals used in processing circuit 101. In other embodiments, multiple clock frequency signals 322 may be received, each indicating a frequency of a respective clock signal. Using values of processor mode 320 and clock frequency 322, dynamic energy calculator may generate a value indicative of the dynamic energy used by processing circuit 101.

To determine the energy usage due to leakage current, leakage energy calculator 310 receives two signals, voltage level 324 and temperature 326. As illustrated, leakage energy calculator 310 uses these signals to estimate an amount of energy that is consumed by leakage currents within processing circuit 101. Leakage through a transistor (or other transconductive device) may be estimated based on a voltage level of power supply node coupled to the transistor, a temperature of the transistor, and knowledge of the leakage characteristics of the transistor and the fabrication process used to create the circuits that include the transistor.

In various embodiments, voltage level 324 may include indications of a voltage level for one or more power supply nodes coupled to processing circuit 101. In a similar manner, temperature 326 may include indications of one or more temperatures associated with processing circuit 101. In some embodiments, a temperature sensor may be included within processor 100 to provide a temperature value of the circuits. In other embodiments, a temperature sensor may be located in other areas and a received value may be used to estimate a temperature within processor 100. Leakage energy calculator 310 may be designed or programmed with information about the leakage characteristics of the circuit elements in processing circuit 101. Using values of voltage level 324 and temperature 326, and the leakage characteristics of the circuits, leakage energy calculator 310 is capable of generating a value indicative of an amount of leakage energy consumed by processing circuit 101.

In some embodiments, leakage energy calculator may also receive processor mode 320 or another signal that provides an indication of sub-circuits in processing circuit 101 that are power-gated. As used herein, "power-gating" refers to a method of preventing a power or ground reference signal from propagating to a circuit. Power-gating may reduce leakage through such gated circuits, and therefore, power-gated sub-circuits may not contribute significant current to leakage current totals for processing circuit 101. Accordingly, leakage energy calculator may exclude leakage current contributions from power-gated sub-circuits.

Energy consumption circuit 113 adds the dynamic energy value received from dynamic energy calculator 305 to the leakage energy value received from leakage energy calculator 310 and then adds the sum to an accumulated energy value stored in accumulated energy register 315. The accumulated energy value may indicate an estimated total amount of energy consumed by processing circuit 101 since a last time energy consumption circuit 113 was reset (e.g., due to a power-on event, or in response to a system reset signal). The accumulated energy value may, in some embodiments, correspond to accumulated energy 202 in chart 200 of FIG. 2. By sampling a value stored in accumulated energy register 315 two or more successive times, an amount of energy used in the time period between two samples may be determined.

The energy consumption circuit shown in FIG. 3 is one example. In other embodiments, a different number of signals may be received and used for determining an accumulated energy value. In FIG. 3, two energy calculators are shown. In other embodiments, additional or different energy calculators may be included. For example, in some embodiments, an additional calculator may be included for estimating energy usage in a memory array utilized by the processing circuit.

FIGS. 1-3 illustrate block diagrams and waveforms associated with the disclosed concepts. Various methods may be employed to operate these disclosed circuits. Two such methods are discussed in regards to FIGS. 4 and 5.

Figure 4:
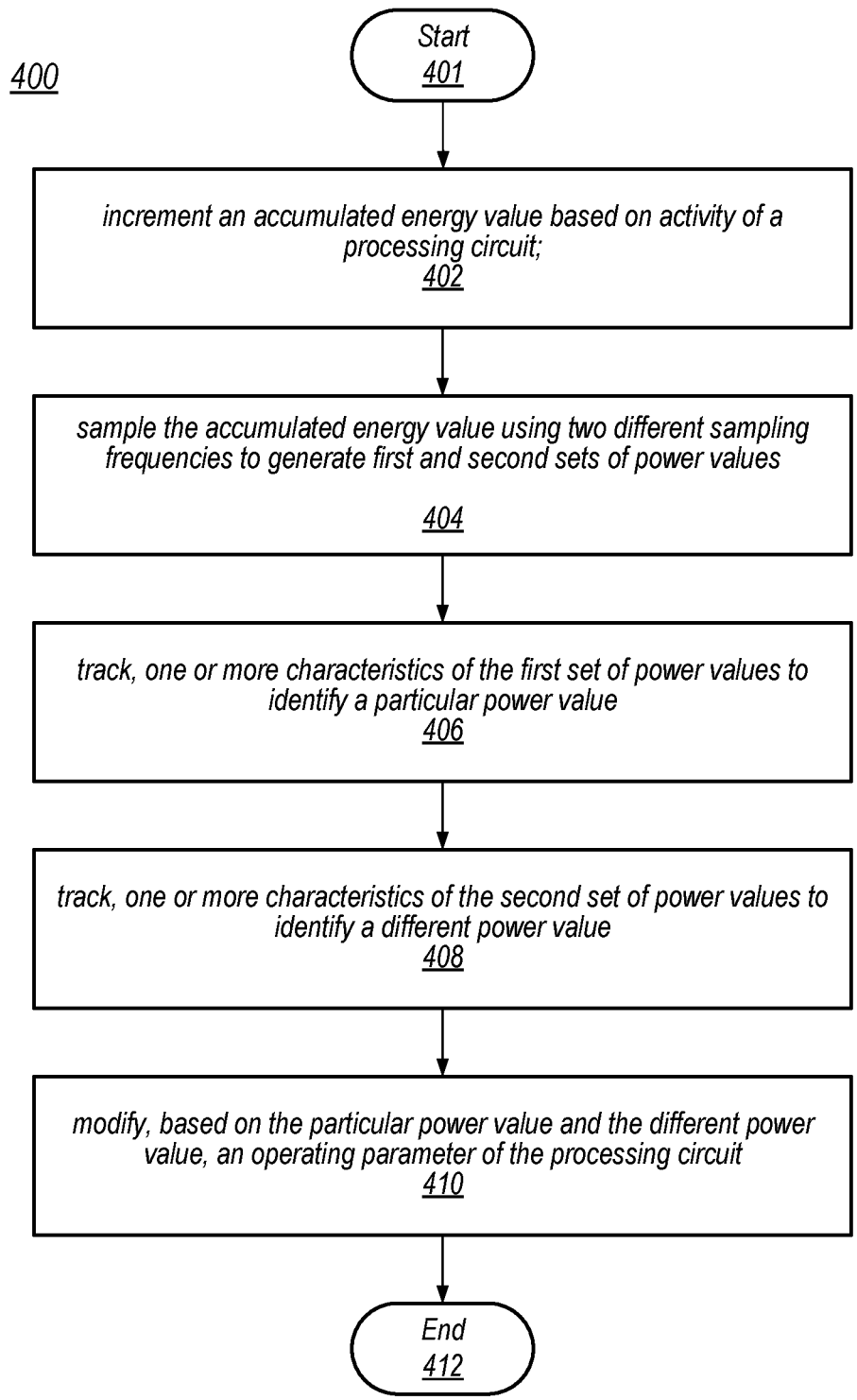
FIG. 4 illustrates a flow diagram of an embodiment of a method for operating a power management circuit.

Proceeding to FIG. 4, a flow diagram illustrating an embodiment of a method for performing power management operations in a processor is shown. Method 400 may be applied to a power management circuit, such as power management circuit 110 in FIG. 1. Referring collectively to power management circuit 110 and the flow diagram in FIG. 4, method 400 begins in block 401.

A power management circuit increments an accumulated energy value based on activity of a processing circuit (block 402). As illustrated, power management circuit 110 uses energy consumption circuit 113 to increment an accumulated energy value that is indicative of an accumulated amount of energy that processing circuit 101 has used. A register storing the accumulated energy value may be reset to an initial value in response to a signal asserted in processor 100 and/or may reset in response to reaching a maximum possible value of the register.

The power management circuit samples the accumulated energy value using two different sampling frequencies to generate first and second sets of power values (block 404). Power management circuit 110, as shown, uses power sampling circuits 115 to sample respective series of values of the accumulated energy value from energy consumption circuit 113. Using two or more sequential samples from a respective series, power sampling circuits 115 each generate a respective set of power values. Sampling clock 117a causes power sampling circuit 115a to sample the accumulated energy value at a first sampling frequency while sampling clock 117b causes power sampling circuit 115b to sample the accumulated energy value at a second sampling frequency. For example, power sampling circuit 115a may sample the accumulated energy value using a sampling frequency that allows for collecting a first set of power values that are each indicative of an average power consumption over a respective sample window. Power sampling circuit 115b may sample the accumulated energy value using a sampling frequency that allows for collecting a second set of power values in which each power value of the set may be indicative of an amount of dynamic power usage deviation over the respective sample window.

The power management circuit tracks one or more characteristics of the first set of power values to identify a particular power value (block 406). Power sampling circuit 115a may identify a particular power value based on the one or more characteristics, such as a maximum or minimum value of the first set of power values. In some embodiments, both maximum and minimum power values may be tracked for the first set of power values. In other embodiments, other characteristics may be used such as maximum or minimum deltas between successive power values of the first set.

The power management circuit tracks one or more characteristics of the second set of power values to identify a different power value (block 408). As illustrated, power sampling circuit 115b identifies a particular power value for the second set of power values based on the tracked characteristics. In a similar manner as described for the first set of power values, a minimum, maximum, or both values may be tracked. Both power sampling circuits 115 may store current minimum and maximum values in respective registers or other memory circuits.

The power management circuit modifies, based on the particular power value and the different power value, an operating parameter of the processing circuit (block 410). Power management circuit 110, as shown, uses power control circuit to determine if the tracked power values from either the first set or the second set are indicative of an undesired power consumption state in processing circuit 101. For example, if the maximum value in the first set is indicative of a rising amount of power consumption, then power processing module 121 may cause one or more operating conditions for processing circuit 101 to be adjusted. For example, a clock signal frequency and/or a power supply voltage level may be reduced to potentially lower the power consumption trend of processing circuit 101. If, however, a maximum value for the second set of power values is indicative of a large increase in dynamic power, due, e.g., to a sudden increase in workload, then power processing module 121 may delay changes to the operating conditions in order to allow processing circuit 101 a particular amount of time to complete the increased workload. The method ends in block 412.

It is noted that method 400 is one example related to operation of a memory cache controller. Method 400 may be repeated until power management circuit 110 is disabled. In some embodiments, the method of FIG. 4 may include additional operations, such as, asserting an interrupt in response to power values reaching one or more threshold values. An example of asserting an interrupt signal is shown in FIG. 5.

Figure 5:
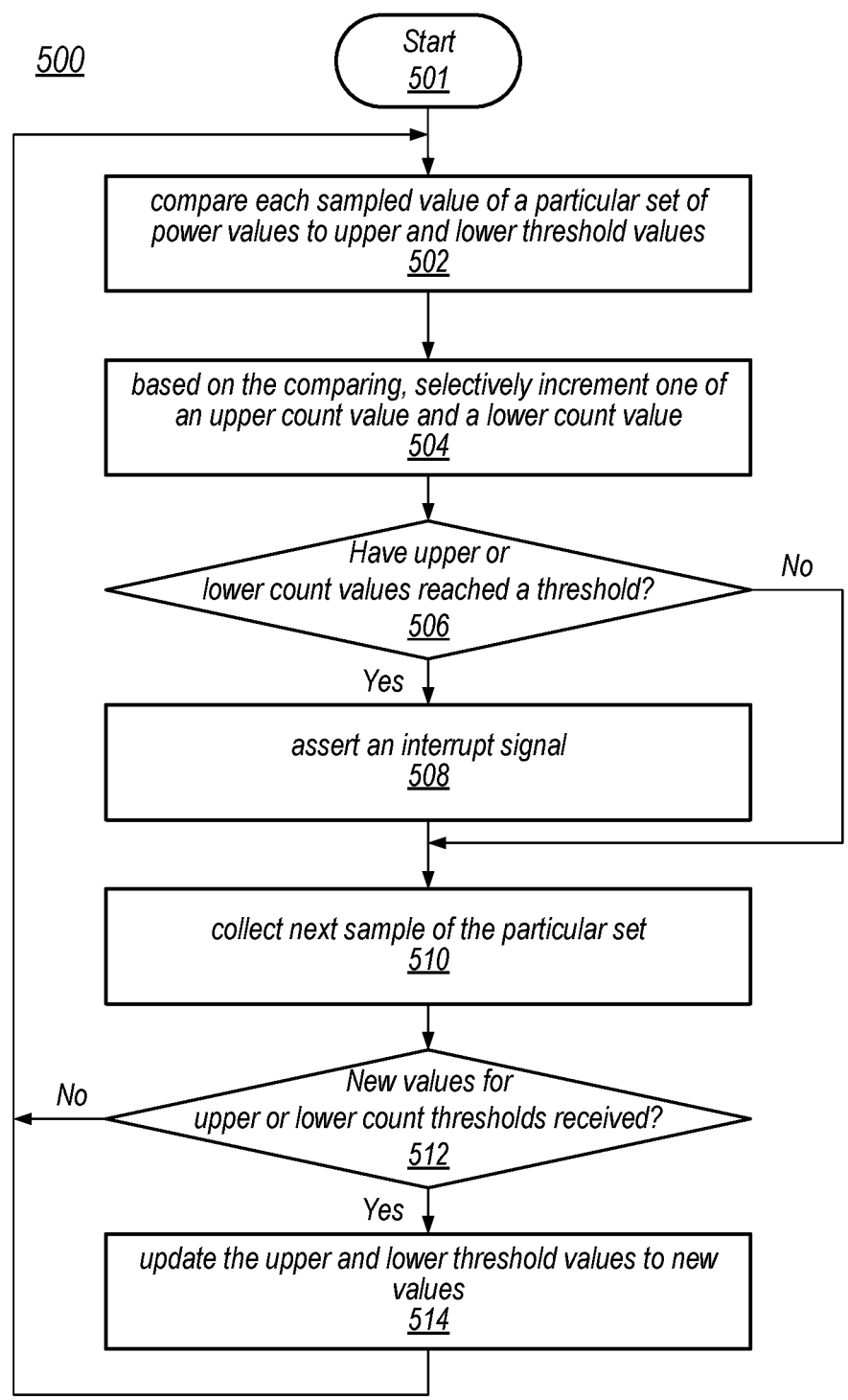
FIG. 5 shows a flow diagram of an embodiment of a method for implementing interrupts in a power management circuit.

Moving now to FIG. 5, a flow diagram depicting an embodiment of a method for asserting an interrupt in response to a count value reaching a threshold value is shown. Method 500, similar to method 400 above, may be applied to a power management circuit, such as power management circuit 110 in FIG. 1. The operations disclosed by method 500 may be performed, in some embodiments, in combination with or as an additional part of method 400. Referring collectively to FIGS. 1 and 2, and the flow diagram of FIG. 5, the method begins in block 501.

A power management circuit compares each sampled value of a first set of power values to upper and lower threshold values (block 502). As illustrated, one of power sampling circuits 115 in power management circuit 110, for example, power sampling circuit 115*a*, generates current power value 212*a* based on two successive samples of an accumulated energy value. Current power value 212*a* is determined based on an amount of energy used during the sampling window and the time period of the sampling window. Power sampling circuit 115*a* compares current power value 212*a* to upper power threshold 218*a* and lower power threshold 220*a*.

The power management circuit, based on the comparison, selectively increments one of an upper count value and a lower count value (block 504). Power sampling circuit 115*a* increments high-power count 222*a* if current power value 212*a* reaches upper power threshold 218*a*. Similarly, power sampling circuit 115*a* increments low-power count 224*a* if current power value 212*a* reaches lower power threshold 220*a*. If, however, current power value 212*a* does not reach either power threshold, then neither high-power count 222*a*, nor low-power count 224*a* is incremented. It is noted that in the example of FIG. 5, a value reaching a threshold refers to a value being greater than an upper threshold value or less than a lower threshold value. In some embodiments, reaching a threshold may further include the value being equal to either the upper or lower threshold values.

Further operations of method 500 may depend on the values of the upper and lower count values (block 506). After either high-power count 222*a* or low-power count 224*a* are incremented, then power sampling circuit 115*a* determines if the incremented count value has reached a threshold count value. In some embodiments, a respective threshold count value may be used for high-power count 222*a* and for low-power count 224*a*, while in other embodiments, a same threshold count value may be used for both counts. If either high-power count 222*a* or low-power count 224*a* has reached a threshold count value, then the method moves to block 508 to assert an interrupt signal. Otherwise, the method moves to block 510 to collect a next energy sample.

The power management circuit asserts an interrupt signal based on the respective values of the upper count value and the lower count value (block 508). If either high-power count 222*a* or low-power count 224*a* reach a threshold count value, then interrupt logic 230*a* asserts an interrupt signal. In various embodiments, the interrupt signal may be sent to processing circuit 101, a different processing circuit in processor 100, or to a processor different than processor 100. A same interrupt signal may be asserted if either high-power count 222*a* or low-power count 224*a* reaches the threshold count value. In other embodiments, respective interrupt signals may be used for each of the counts.

The power management circuit takes a next sample of the accumulated energy value (block 510). Power sampling circuit 115*a*, as shown, takes a next sample of the accumulated energy value at the end of a current sample window. Using the just taken sample and the preceding sample of the accumulated energy value, power sampling circuit 115*a* generates a new value for current power value 212*a*. The current sample window may be complete.

Subsequent operations of the method may depend on receiving a new value for the upper and lower threshold values (block 512). As illustrated, upper power threshold 218*a*, lower power threshold 220*a*, and the threshold count value may be set to new values while power sampling circuit 115*a* is active. If a new value for any of the thresholds is received within the just completed sample window, then method 500 moves to block 514 to update upper power threshold 218*a*, lower power threshold 220*a*, and/or the threshold power count with the received new value. Otherwise, method 500 moves to block 502 to compare the new value of current power value 212*a* to upper power threshold 218*a* and lower power threshold 220*a*.

Power sampling circuit 115*a* updates the upper and lower threshold values to new values (block 514). If a new value is received for a threshold in power sampling circuit 115*a*, then the new value replaces the previous value after the end of the sampling window in which the new value was received. Method 500 returns to block 502 to compare the new value of current power value 212*a* to updated values of upper power threshold 218*a* and lower power threshold 220*a*.

It is noted that method 500 is an example technique for implementing interrupts in a power management circuit. Although power sampling circuit 115*a* is used in the example, method 500 may be similarly applied to power sampling circuit 115*b*.

Figure 6:
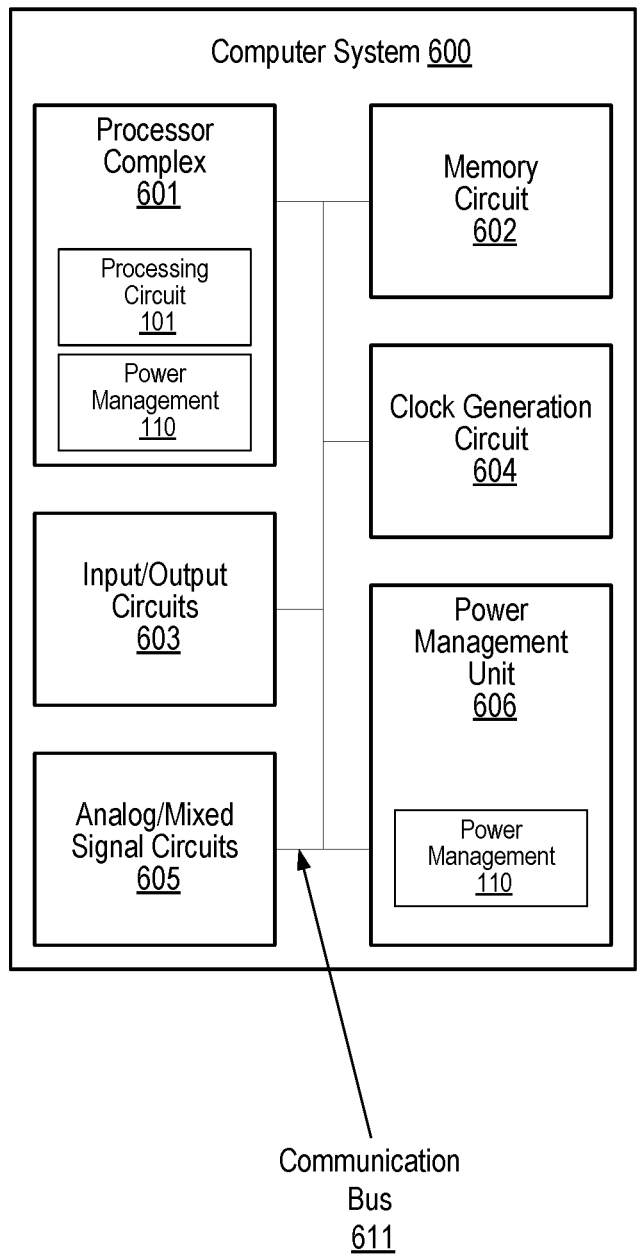
FIG. 6 depicts a block diagram of an embodiment of a computer system that includes a power management circuit.

FIGS. 1-5 illustrate apparatus and methods for a power management circuit in a processor. Power management circuits and processor circuits, such as those described above, may be used in a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 600 that includes the disclosed circuits is illustrated in FIG. 6. In some embodiments, computer system 600 may provide an example of an integrated circuit that includes processor 100 in FIG. 1. As shown, computer system 600 includes processor complex 601, memory circuit 602, input/output circuits 603, clock generation circuit 604, analog/mixed-signal circuits 605, and power management unit 606. These functional circuits are coupled to each other by communication bus 611.

In some embodiments, processor complex 601 may, correspond to or include processor 100. Processor complex 601, in various embodiments, may be representative of a general-purpose processor that performs computational operations. For example, processor complex 601 may be a central processing unit (CPU) such as a microprocessor, a microcontroller, an application-specific integrated circuit (ASIC), or a field-programmable gate array (FPGA). In some embodiments, processor complex 601 may correspond to a special purpose processing core, such as a graphics processor, audio processor, or neural processor, while in other embodiments, processor complex 601 may correspond to a general-purpose processor configured and/or programmed to perform one such function. Processor complex 601, in some embodiments, may include a plurality of general and/or special purpose processor cores (e.g., processing circuit 101 in FIG. 1) as well as supporting circuits for managing, e.g., power signals, clock signals, and memory requests. In addition, processor complex 601 may include one or more levels of cache memory to fulfill memory requests issued by included processor cores. In some embodiments, processor complex 601 may include power management circuits such as power management circuit 110 in FIG. 1.

Memory circuit 602, in the illustrated embodiment, includes one or more memory circuits for storing instructions and data to be utilized within computer system 600 by processor complex 601. In various embodiments, memory circuit 602 may include any suitable type of memory such as a dynamic random-access memory (DRAM), a static random access memory (SRAM), a read-only memory (ROM), electrically erasable programmable read-only memory (EEPROM), or a non-volatile memory, for example. It is noted that in the embodiment of computer system 600, a single memory circuit is depicted. In other embodiments, any suitable number of memory circuits may be employed.

Input/output circuits 603 may be configured to coordinate data transfer between computer system 600 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 603 may be configured to implement a version of Universal Serial Bus (USB) protocol or IEEE 1394 (Firewire®) protocol.

Input/output circuits 603 may also be configured to coordinate data transfer between computer system 600 and one or more devices (e.g., other computing systems or integrated circuits) coupled to computer system 600 via a network. In one embodiment, input/output circuits 603 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 603 may be configured to implement multiple discrete network interface ports.

Clock generation circuit 604 may be configured to enable, configure and manage outputs of one or more clock sources. In various embodiments, the clock sources may be located in analog/mixed-signal circuits 605, within clock generation circuit 604, in other blocks with computer system 600, or come from a source external to computer system 600, coupled through one or more I/O pins. In some embodiments, clock generation circuit 604 may be capable of enabling and disabling (e.g., gating) a selected clock source before it is distributed throughout computer system 600. Clock generation circuit 604 may include registers for selecting an output frequency of a phase-locked loop (PLL), delay-locked loop (DLL), frequency-locked loop (FLL), or other type of circuits capable of adjusting a frequency, duty cycle, or other properties of a clock or timing signal.

Analog/mixed-signal circuits 605 may include a variety of circuits including, for example, a crystal oscillator, PLL or FLL, and a digital-to-analog converter (DAC) (all not shown) configured to generated signals used by computer system 600. In some embodiments, analog/mixed-signal circuits 605 may also include radio frequency (RF) circuits that may be configured for operation with cellular telephone networks. Analog/mixed-signal circuits 605 may include one or more circuits capable of generating a reference voltage at a particular voltage level, such as a voltage regulator or band-gap voltage reference.

Power management unit 606 may be configured to generate a regulated voltage level on a power supply signal for processor complex 601, input/output circuits 603, memory circuit 602, and other circuits in computer system 600. In various embodiments, power management unit 606 may include one or more voltage regulator circuits, such as, e.g., a buck regulator circuit, configured to generate the regulated voltage level based on an external power supply (not shown). In some embodiments any suitable number of regulated voltage levels may be generated. Additionally, power management unit 606 may include various circuits for managing distribution of one or more power signals to the various circuits in computer system 600, including maintaining and adjusting voltage levels of these power signals. Power management unit 606 may include circuits for monitoring power usage by computer system 600, including determining or estimating power usage by particular circuits. For example, power management unit 606 may determine power usage by each of a plurality of processor circuits in processor complex 601. Based on the determined power usage, power management unit 606 may allocate a respective number of power credits to some or all of the particular circuits. Power management circuit 110 may, in some embodiments, be included in power management unit 606 rather than, or in addition to, in processor complex 601.

It is noted that the embodiment illustrated in FIG. 6 includes one example of a computer system. A limited number of circuit blocks are illustrated for simplicity. In other embodiments, any suitable number and combination of circuit blocks may be included. For example, in other embodiments, security and/or cryptographic circuit blocks may be included.

Figure 7:
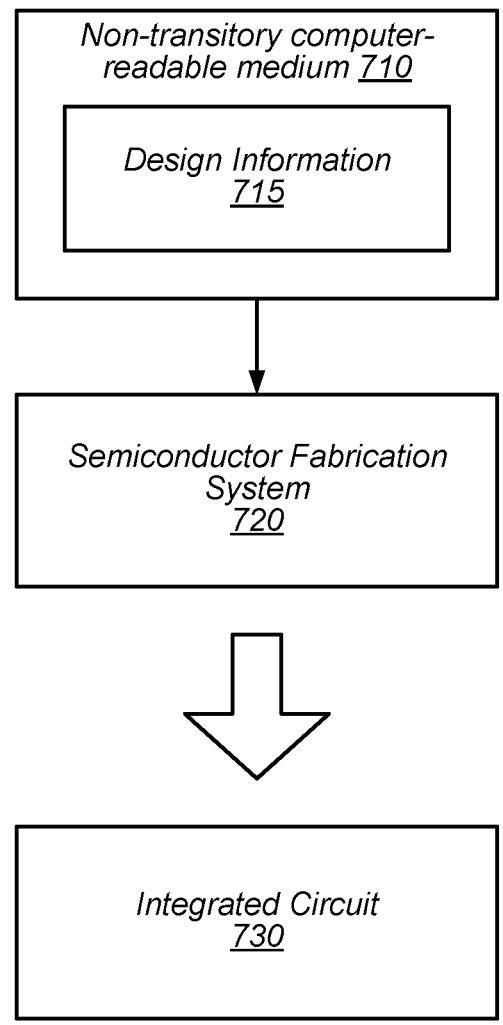
FIG. 7 illustrates a block diagram depicting an example computer-readable medium, according to some embodiments.

FIG. 7 is a block diagram illustrating an example of a non-transitory computer-readable storage medium that stores circuit design information, according to some embodiments. The embodiment of FIG. 7 may be utilized in a process to design and manufacture integrated circuits, such as, for example, an IC that includes computer system 600 of FIG. 6. In the illustrated embodiment, semiconductor fabrication system 720 is configured to process the design information 715 stored on non-transitory computer-readable storage medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system, such as semiconductor fabrication system 720, for example. In some embodiments, design information 715 may include a netlist that specifies elements of a cell library, as well as their connectivity. One or more cell libraries used during logic synthesis of circuits included in integrated circuit 730 may also be included in design information 715. Such cell libraries may include information indicative of device or transistor level netlists, mask design data, characterization data, and the like, of cells included in the cell library.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown or described herein. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a processing circuit configured to operate using a current set of operating parameters;
a power processing module; and
a power management circuit configured to:
accumulate, over time, an estimated energy consumption value of the processing circuit;
sample the estimated energy consumption value using a plurality of different sampling frequencies, wherein a first sampling frequency is used to generate a first set of power values and a second sampling frequency is used to generate a second set of power values, wherein the second sampling frequency is greater than the first sampling frequency;
track an average power value of the processing circuit by using the first set of power values;
track a dynamic power value of the processing circuit by using the second set of power values; and
provide, to the power processing module, the average and dynamic power values;
wherein the power processing module is configured to adjust, based on the provided average and dynamic power values, a power consumption of the processing circuit by modifying at least one of the current set of operating parameters of the processing circuit.

2. The apparatus of claim 1, wherein the power management circuit is further configured to track a respective maximum value for the tracked average power values and for the tracked dynamic power values.

3. The apparatus of claim 1, wherein the power management circuit is further configured to increment a respective count value in response to a determination that a generated power value of a corresponding set satisfies a threshold value.

4. The apparatus of claim 3, wherein a new value for the threshold value is selectable by software, and wherein the power management circuit is further configured to update the threshold value to the new value after a next sample of the estimated energy consumption value is taken.

5. The apparatus of claim 3, wherein the power management circuit is further configured to assert a processor interrupt signal in response to a determination that one of the respective count values reaches a threshold count value.

6. The apparatus of claim 1, wherein to estimate energy consumption of the processing circuit, the power management circuit is further configured to utilize separate estimates for dynamic currents and for leakage currents.

7. The apparatus of claim 1, wherein to adjust the power consumption of the processing circuit, the power processing module is further configured to:
determine the average power value over a first time period; and
determine the dynamic power value over a second time period, shorter than the first time period.

8. A method, comprising:
accumulating, by a power management circuit, an accumulated energy value based on activity of a processing circuit, wherein the processing circuit is operating using a current set of operating parameters;
sampling, by the power management circuit, the accumulated energy value using first and second sampling frequencies to generate first and second sets of power values, respectively, wherein the second sampling frequency is greater than the first sampling frequency;
tracking one or more characteristics, including an average power consumption of the processing circuit, using the first set of power values; and tracking one or more characteristics, including a dynamic power consumption of the processing circuit, using the second set of power values; and modifying, based on the average power consumption and the dynamic power consumption, at least one of the current set of operating parameters to adjust a power consumption of the processing circuit.

9. The method of claim 8, further comprising tracking respective maximum values for the average and dynamic power consumptions.

10. The method of claim 9, further comprising tracking, by the power management circuit, respective minimum values for the first and second sets of power values.

11. The method of claim 8, further comprising:
comparing, by the power management circuit, each sampled value of the first set of power values to upper and lower threshold values; and
based on the comparing, selectively incrementing one of an upper count value and a lower count value.

12. The method of claim 11, further comprising asserting, by the power management circuit, a processor interrupt signal based on respective values of the upper count value and the lower count value.

13. The method of claim 11, further comprising updating the upper and lower threshold values to new values after a next sample of the accumulated energy value is taken.

14. The method of claim 8, wherein modifying at least one of the current set of operating parameters comprises:
determining the average power consumption over a first time period using the first set of power values; and
determining the dynamic power consumption over a second time period, shorter than the first time period.

15. An apparatus, comprising:
an energy consumption circuit configured to increment an accumulated energy value based on activity of a processing circuit that is configured to operate using a current set of operating parameters;
a power sampling circuit configured to:
sample the accumulated energy value using first and second sampling frequencies to generate, respectively, first and second sets of power values, wherein the second sampling frequency is greater than the first sampling frequency;
identify, using one or more criteria, a first plurality of average power values of the processing circuit for the first set of power values; and
identify, using the one or more criteria, a second plurality of dynamic power values of the processing circuit for the second set of power values; and
a power processing module configured to modify, based on the average and dynamic power values, at least one of the current set of operating parameters to adjust a power consumption of the processing circuit.

16. The apparatus of claim 15, wherein the power sampling circuit is further configured to track respective maximum and minimum values for the average and dynamic power values.

17. The apparatus of claim 15, wherein the power sampling circuit is further configured to:
make a comparison of each sampled value of the first set of power values to upper and lower threshold values; and
based on the comparison, selectively increment an upper count value or a lower count value.

18. The apparatus of claim 17, wherein the power sampling circuit is further configured to assert a processor interrupt signal in response to a value of the upper count value or a value of the lower count value reaching a respective threshold count value.

19. The apparatus of claim 17, wherein, in response to receiving respective new values for the upper and lower threshold values, the power sampling circuit is further configured to update the upper and lower threshold values to the new values after a next sample of the accumulated energy value is taken.

20. The apparatus of claim 15, wherein to increment the accumulated energy value based on activity of the processing circuit, the energy consumption circuit is further configured to utilize separate estimates for dynamic currents and for leakage currents.

* * * * *